(12) United States Patent
Kakuda et al.

(10) Patent No.: US 11,886,246 B2
(45) Date of Patent: Jan. 30, 2024

(54) ELECTRONIC DEVICES WITH SHAPE-TRANSFORMING DISPLAYS

(71) Applicant: Apple Inc., Cupertino, CA (US)

(72) Inventors: Tyler R. Kakuda, San Francisco, CA (US); Christopher E. Glazowski, Santa Cruz, CA (US); Elizabeth C. Porter, Sunnyvale, CA (US); Hao Dong, San Jose, CA (US); Jean-Pierre S. Guillou, La Jolla, CA (US); Warren S. Rieutort-Louis, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/900,266

(22) Filed: Aug. 31, 2022

(65) Prior Publication Data

US 2022/0413546 A1  Dec. 29, 2022

Related U.S. Application Data

(63) Continuation of application No. 16/921,750, filed on Jul. 6, 2020, now Pat. No. 11,493,958.

(60) Provisional application No. 62/905,558, filed on Sep. 25, 2019.

(51) Int. Cl.
  *G06F 1/16* (2006.01)
  *G04G 17/04* (2006.01)
  *G02B 6/04* (2006.01)

(52) U.S. Cl.
  CPC .............. *G06F 1/163* (2013.01); *G02B 6/04* (2013.01); *G04G 17/045* (2013.01); *G06F 1/1637* (2013.01)

(58) Field of Classification Search
  CPC ...... G06F 3/0421; G06F 3/0445; G06F 3/167; G02B 6/06; G02B 6/08; G02B 6/0078; G02B 6/01; G02B 6/04
  See application file for complete search history.

(56) References Cited

U.S. PATENT DOCUMENTS

| | | |
|---|---|---|
| 8,057,083 B2 | 11/2011 | Harris |
| 8,958,137 B2 | 2/2015 | Haussler |
| 11,231,814 B1 | 1/2022 | Wittenberg et al. |
| 2016/0011633 A1 | 1/2016 | Watanabe et al. |
| 2017/0243373 A1 | 8/2017 | Bevensee et al. |
| 2018/0128973 A1 | 5/2018 | Powell et al. |
| 2019/0391326 A1 | 12/2019 | Yang et al. |

*Primary Examiner* — Joseph L Williams
(74) *Attorney, Agent, or Firm* — Treyz Law Group, P.C.; G. Victor Treyz; Tianyi He

(57) ABSTRACT

An electronic device may have a housing with a display. The display may be overlapped by an image transport layer such as a coherent fiber bundle or layer of Anderson localization material. The image transport layer may have an input surface that receives an image from the display and a corresponding output surface to which the image is transported. The input surface and output surface may have different shapes. A wristwatch device may, as an example, have a rectangular or hexagonal input surface and may have an output surface such as a rectangular output surface with rounded corners or a circular output surface. A region of the output surface may have compound curvature. A portion of the image transport layer may protrude laterally over an inactive portion of the display.

20 Claims, 9 Drawing Sheets

ELECTRONIC DEVICES WITH SHAPE-TRANSFORMING DISPLAYS

This application is a continuation of U.S. non-provisional patent application Ser. No. 16/921,750, filed Jul. 6, 2020, now U.S. Pat. No. 11,493,958, which claims the benefit of U.S. provisional patent application No. 62/905,558, filed Sep. 25, 2019. The disclosures of these two applications are hereby incorporated by reference herein in their entireties.

FIELD

This relates generally to electronic devices, and, more particularly, to electronic devices with displays.

BACKGROUND

Electronic devices may have displays. Displays have arrays of pixels for displaying images for a user. The shape of many displays can pose challenges during integration into an electronic device, particularly in situations where space is limited.

SUMMARY

An electronic device may have a housing with a display. An image transport layer may overlap the display. The image transport layer may have a coherent fiber bundle or a layer of Anderson localization material. The image transport layer may have an input surface that receives an image from the display and a corresponding output surface to which the image is transported. A protective layer of glass or other transparent material may overlap the output surface of the image transport layer.

The input surface and output surface of the image transport layer may have different shapes. A wristwatch device may, as an example, have an image transport layer with a rectangular or hexagonal input surface or other and may have an output surface such as a rectangular output surface with rounded corners or a circular output surface. A region of the output surface may have compound curvature.

In some configurations, the display may have an active area in which an array of pixels generates an image and an inactive area that is free of pixels and contains only non-light-emitting circuitry such as display driver circuitry. The display driver circuitry and the pixels may be formed on a common substrate. To help integrate the display into the interior of an electronic device, a portion of the image transport layer may protrude laterally over the inactive portion of the display.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an image transport layer. The image transport layer may have an input surface that receives an image from the array of pixels and a corresponding output surface to which the image is transported from the input surface. A user viewing the image transport layer will view the image from the array of pixels as being located on the output surface.

In configurations in which the input and output surfaces have different shapes, the image transport layer may be used to warp the image produced by the array of pixels. For example, the shape of the image can be transformed and the effective size of the image can be changed as the image passes through the image transport layer. In some configurations, edge portions of the image are stretched outwardly to help minimize display borders.

Image transport layers can be formed from coherent fiber bundles (sometimes referred to as fiber optic plates) and/or Anderson localization material. Glass and/or polymer may be used in forming image transport layer structures. To help protect the output surface of an image transport layer, an optional transparent protective layer may be included on the outer surface of the display cover layer. This transparent protective layer may be, for example, a glass plate, or a protective layer formed from other transparent material such as clear polymer or sapphire or other crystalline materials. In some arrangements, image transport layers and/or protective layers can be formed over components other than displays.

Figure 1:
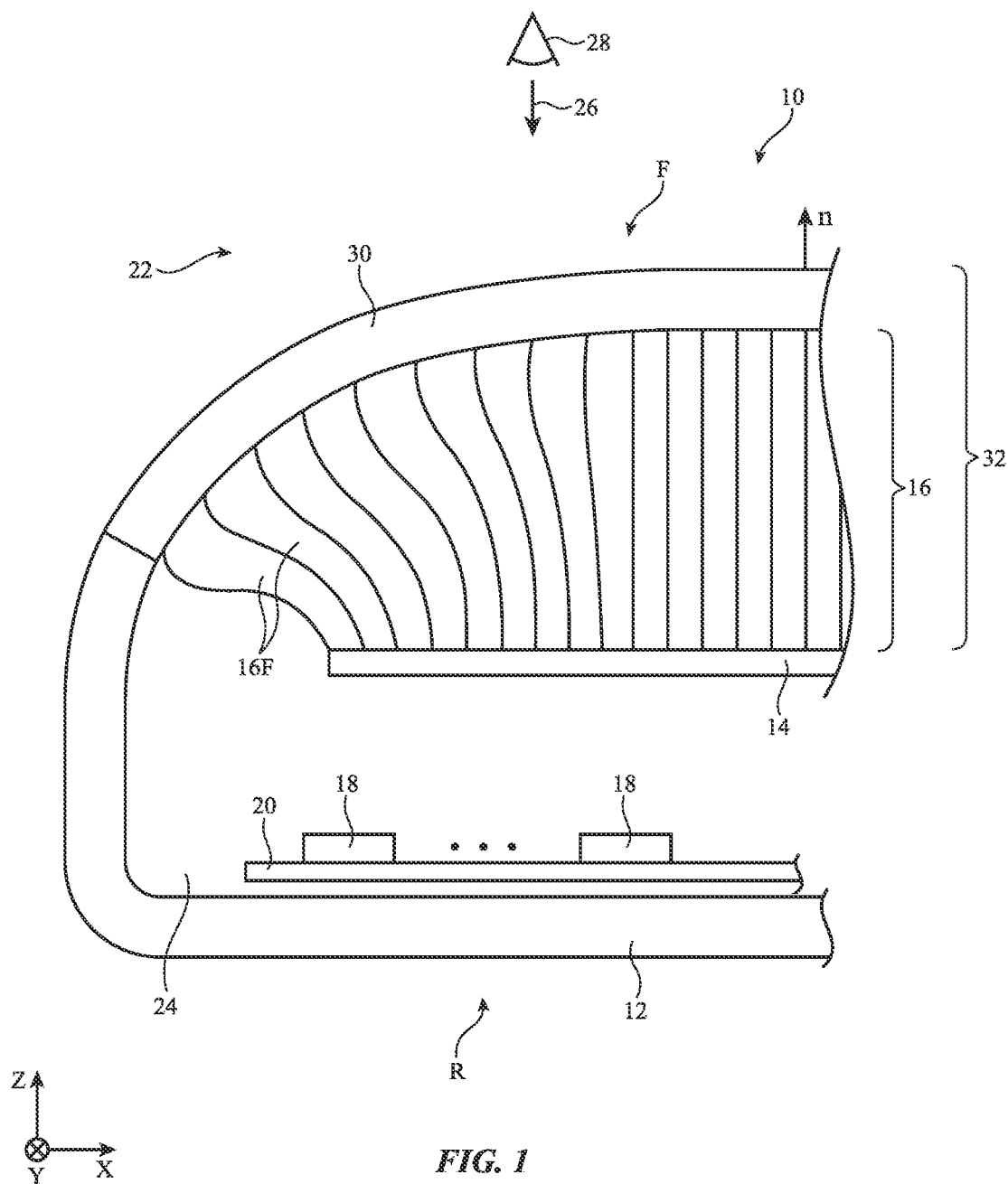
FIG. 1 is a side view of an illustrative electronic device with an image transport layer in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
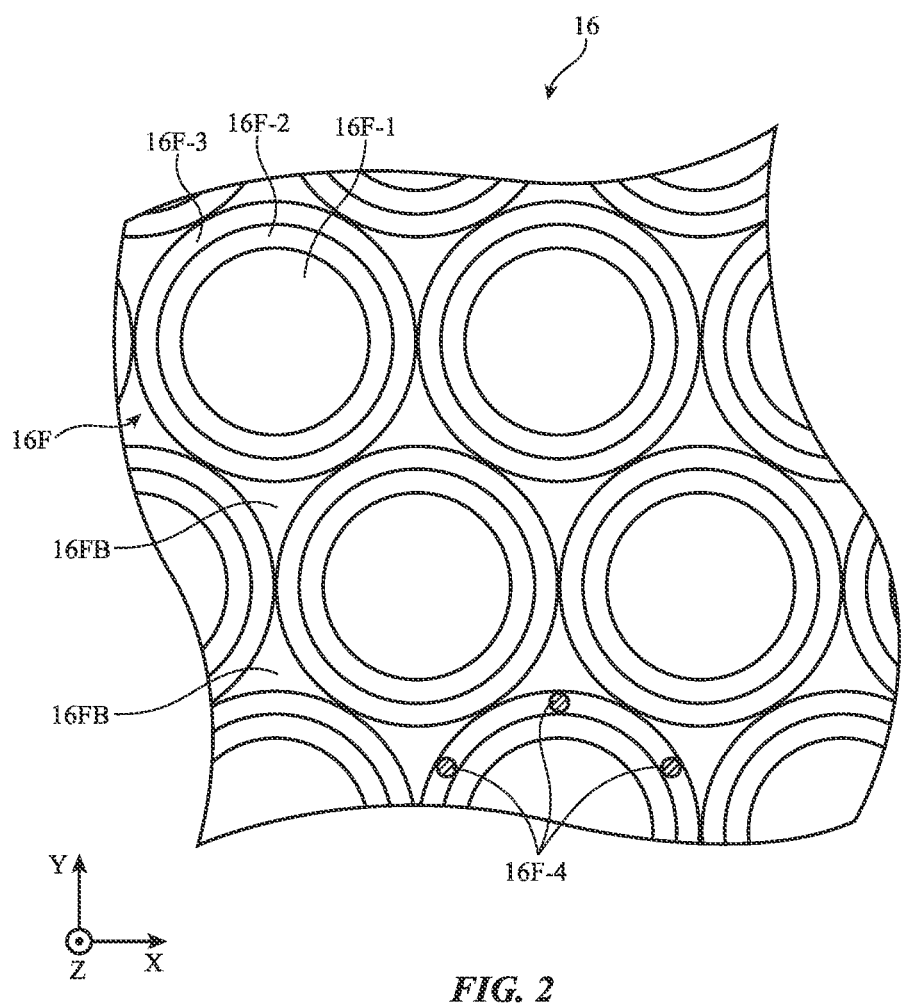
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material or lower than the refractive index of the cladding material to promote total internal reflection (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

If desired, image transport layer 16 may be formed from Anderson localization material in addition to or instead of fibers 16F. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Figure 3:
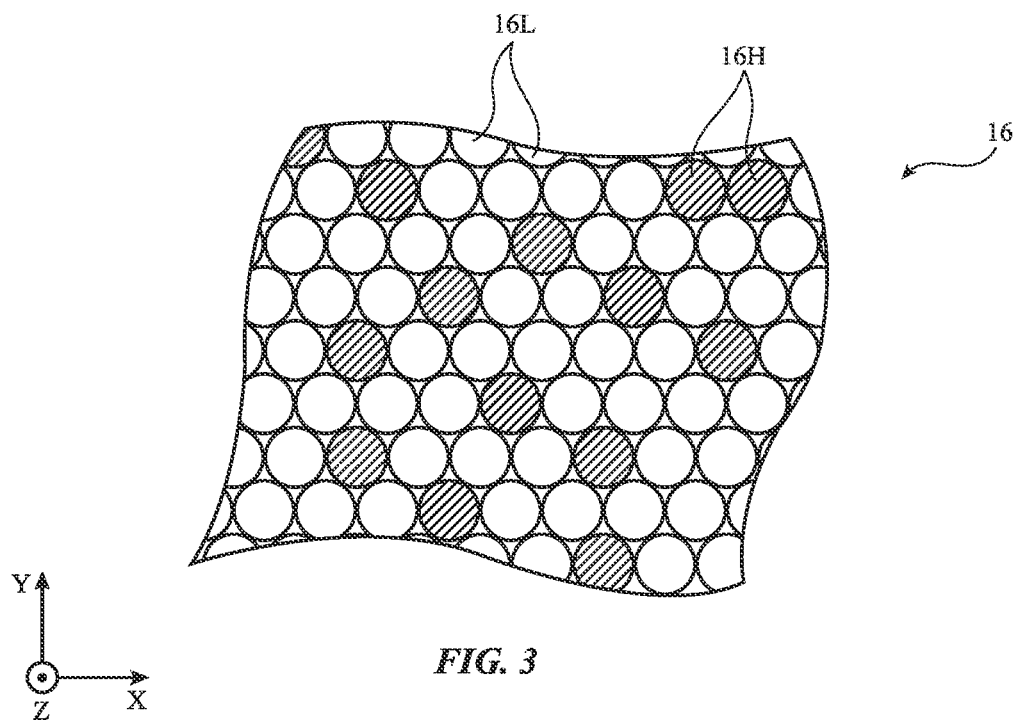
FIG. 3 is a cross-sectional view of a portion of an illustrative image transport layer formed using Anderson localization material in accordance with an embodiment.

FIG. 3 is a cross-sectional view of a portion of an image transport layer formed from Anderson localization material. In the example of FIG. 3, image transport layer 16 includes a random (pseudorandom) set of elongated optical structures of different refractive index values. These structures may, for example, be optical filaments that run into and out of the page of FIG. 3 and that have different refractive index values such as first filaments 16H with higher refractive index values and second filaments 16L with lower refractive index values. The refractive indices of filaments 16L and 16H may differ by any suitable amount (e.g., by at least 0.05, at least 0.1, at least 0.2, at least 0.3, by less than 0.8, etc.). The filaments may be distributed laterally (in dimensions X and Y) with a random pattern and may have any suitable cross-sectional shape (circular, rectangular, etc.). Anderson localization material preforms can be formed by drawing and assembling individual filaments of different refractive index values into bundles and/or can be formed by extruding lengths of material that include laterally interspersed areas of different respective refractive index values. Preforms can then be formed into layer 16 using one or more fusing and drawing operations. Other fabrication techniques may be used, if desired. To absorb stray light within an image transport layer formed from Anderson localization material, the Anderson localization material may include light absorbing material (e.g., light-absorbing filaments interspersed with transparent filaments or other light-absorbing structures).

Figure 4:
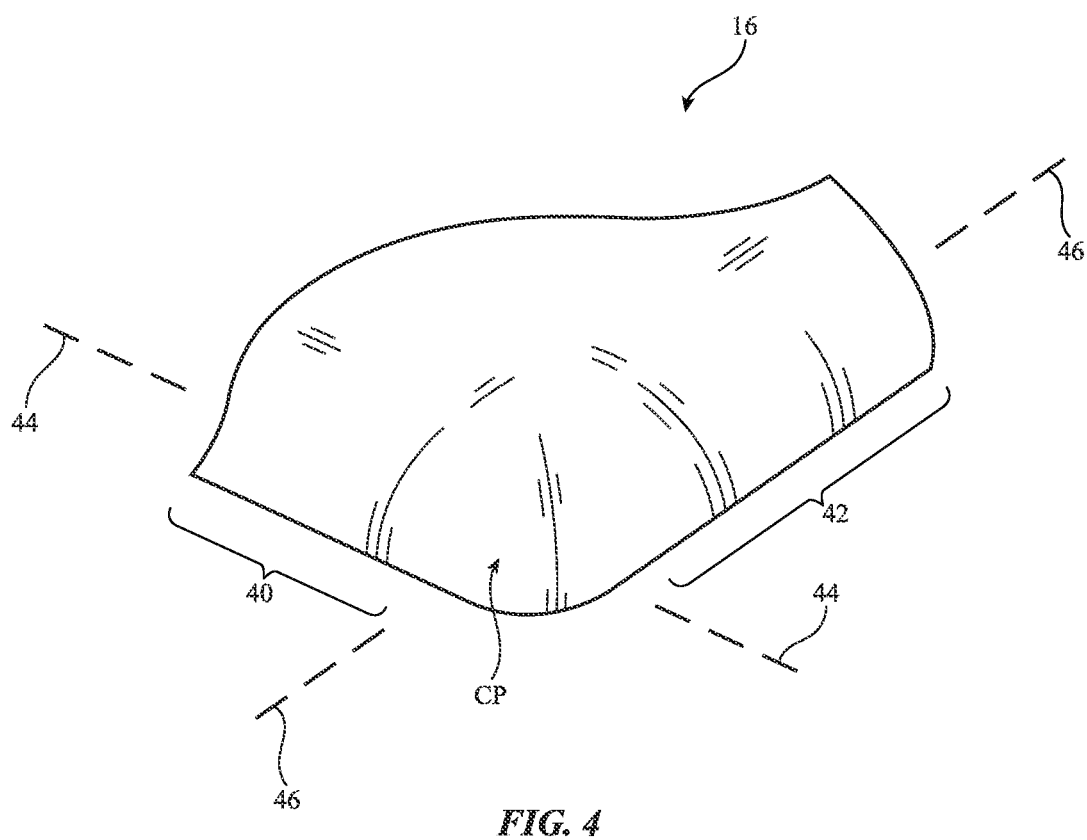
FIG. 4 is a perspective view of a portion of an image transport layer surface with compound curvature in accordance with an embodiment.

Image transport layers can be used to transport an image from a first surface (e.g., the surface of a pixel array) to a second surface (e.g., a surface in device 10 with compound curvature or other curved and/or planar surface shape) while preserving the integrity of the image. A perspective view of an illustrative corner portion of image transport layer 16 is shown in FIG. 4. In the example of FIG. 4, device 10 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 4, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces). When overlapped by protective layer 30, the overlapping portions of protective layer 30 may have corresponding surfaces with compound curvature. When selecting the size and shape of the output surface of layer 16 and therefore the size and shape of the image presented on the output surface, the use of an image transport layer material with compound curvature can provide design flexibility.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 5. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

Figure 5:
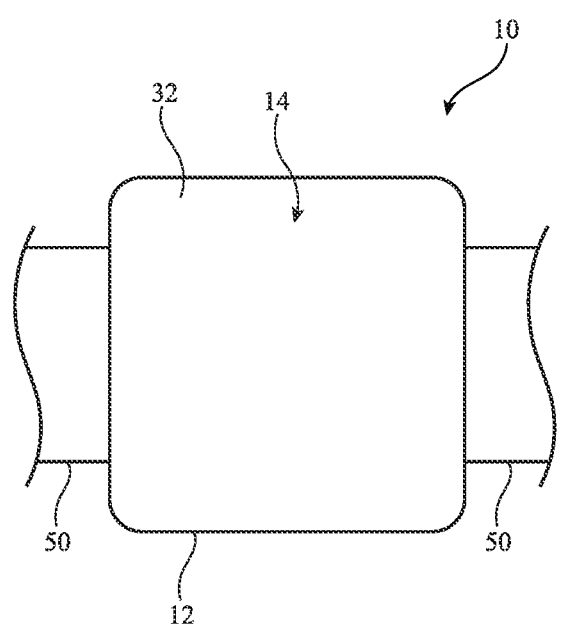
FIG. 5 is a top view of an illustrative electronic device in accordance with an embodiment.

In the example of FIG. 5, device 10 has a rectangular outline with curved corners. By shaping image transport layer 16 (e.g., by molding, polishing, slumping, and/or by otherwise shaping the fibers and/or Anderson localization material of layer 16 appropriately), the input surface of layer 16 at which image light is received and the corresponding output surface of layer 16 to which the received image is transported may have any suitable shapes. These shapes and the overall three-dimensional configuration of layer 16 may be selected to enhance packing efficiency, reduce pixel array fabrication complexity, and/or otherwise enhance the manufacturability and/or performance of device 10 while providing device 10 with a desired appearance. As an example, a square or rectangular shape may be used for the input surface of layer 16, which is well matched to a pixel array having a corresponding square or rectangular outline, whereas a shape with rounded corners, curved edges, a circular outline, or other attractive shape may be used for the output surface of layer 16 where the image from the pixel array is viewed by a user of device 10.

Figure 6:
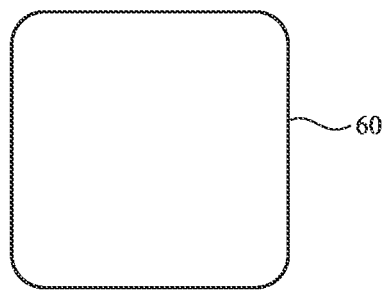
FIGS. 6, 7, 8, 9, and 10 are illustrative shapes that may be used for image transport layer input surfaces and that may be used for corresponding image transport layer output surfaces in accordance with embodiments.
Figure 7:
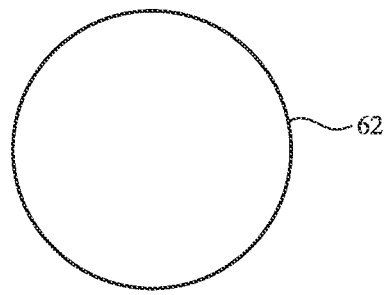
Figure 8:
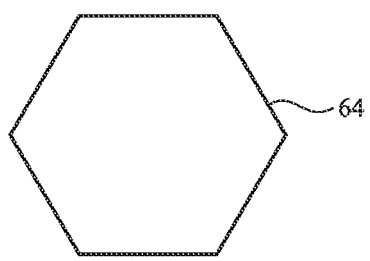
Figure 9:
Figure 10:
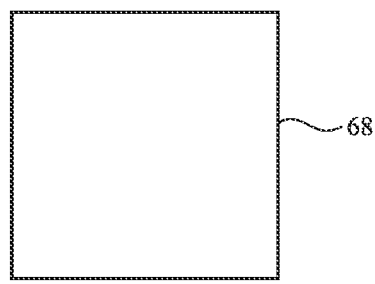

Illustrative shapes for input and output surfaces of layer 16 are shown in FIGS. 6, 7, 8, and 9. These shapes, which may sometimes be referred to as footprints or outlines, correspond to the shape of the input or output surface of layer 16 when viewed from above or below. In the example of FIG. 6, surface 60 has a square shape with rounded corners. In the example of FIG. 7, surface 62 has a circular shape. A non-circular shape (e.g., a hexagonal shape) is used for illustrative surface 64 of FIG. 8. As shown by illustrative surface 66 of FIG. 9, non-circular shapes such as rectangular shapes may be used for input and output surfaces. The input and output surfaces of layer 16 may, in general, have straight edges, curved edges, or a combination of straight and curved edges. For example, surface 60 of FIG. 6 and surface 66 of FIG. 9 have both straight edge segments and curved corner edge segments. Surface 62 of FIG. 7 has only a curved peripheral edge and no straight edges. As shown by surface 68 of FIG. 10, a rectangular (e.g., a square) surface for image transport layer 16 may have sharp corners (e.g., uncurved corners). Input surfaces characterized by rectangular shapes with uncurved corners may mate well with pixel arrays (displays 14) that have corresponding rectangular shapes with uncurved corners. Some shapes may improve fill factor. For example, a non-circular active area shape such as a hexagonal display active area that produces a non-circular image such as a hexagonal image and an associated non-circular input surface such as a hexagonal input surface in layer 16 may be effective at providing image light to a circular output surface, because a hexagon has a shape that is close to being a circle.

In general, display 14 may have any suitable shape, the corresponding input surface of layer 16 that receives an image from display 14 may have a matching shape (e.g., a shape identical to that of the active area and received image), and the corresponding output surface of layer 16 to which the received image is transported may have any suitable shape that is warped (or unchanged) with respect to the input surface.

Figure 11:
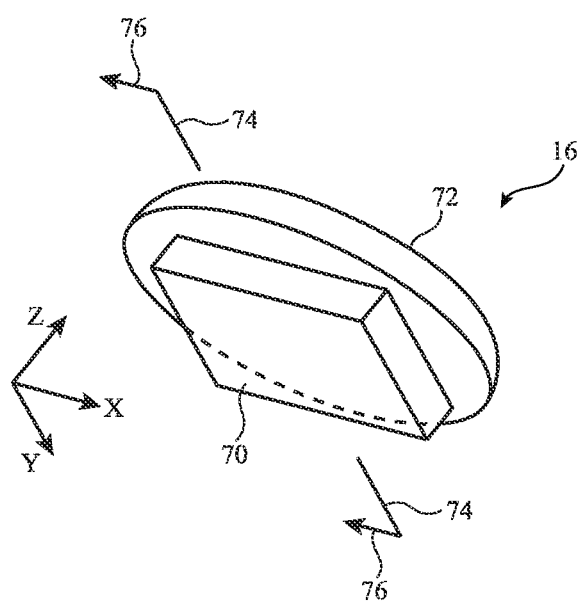
FIG. 11 is a perspective view of the underside and input surface of an illustrative image transport layer in accordance with an embodiment.
Figure 12:
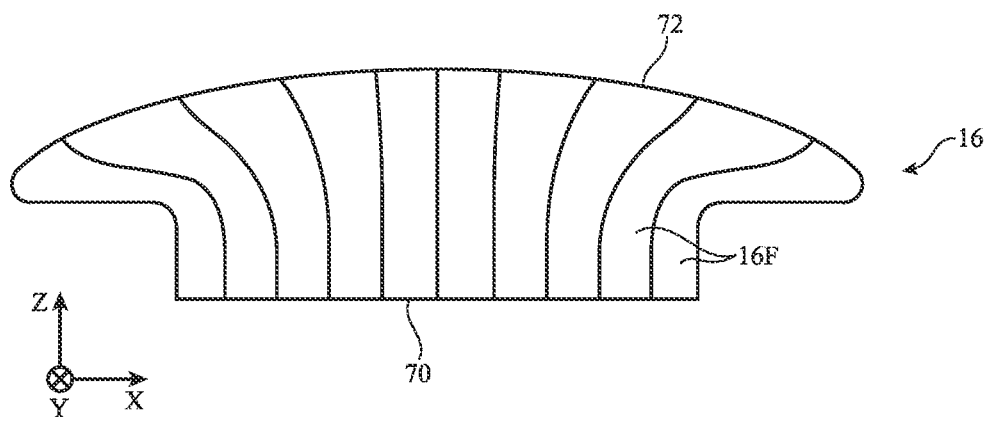
FIG. 12 is a cross-sectional side view of the illustrative image transport layer structure of FIG. 11 in accordance with an embodiment.

Consider, as an example, the arrangement of FIGS. 11 and 12. As shown in the perspective view of layer 16 of FIG. 11, layer 16 may have a first surface such as input surface 70 and a second surface such as output surface 72. Input surface 70 may have a rectangular shape (e.g., a square shape) with uncurved corners for receiving light from a rectangular display (e.g., a display with a shape such as surface 68 of FIG. 10). Fibers 16F and/or the filaments in Anderson localization material forming layer 16 may be formed into a shape that is characterized by a circular output surface, as shown by the circular shape of output surface 72 of FIG. 11. The circular shape of output surface 72 may be used to present a circular watch face or other circular image to viewer 28. The square image produced by the display at input surface 70 can be digitally predistorted (prewarped). Digital prewarping of the image on display 14 can compensate for the subsequent optical image warping produced by layer 16 as the image passes through layer 16, thereby ensuring that the distorted image on display 14 appears normal and undistorted (unwarped) to the user viewing the output image on output surface 72.

A cross-sectional side view of image transport layer 16 of FIG. 11 taken along line 74 and viewed in direction 76 is shown in FIG. 12. As shown in FIG. 12, input surface 70 may be planar, which allows input surface 70 to mate with a planar pixel array (e.g., display 14). A layer of adhesive or other material may optionally be placed between display 14 and input surface 70 (e.g., to help reduce reflection and to help mount display 14 within device 10). Output surface 72 may have a planar surface and/or may have one or more portions with curved cross-sectional profiles. If desired, some or all of output surface 72 may be characterized by compound curvature, as described in connection with FIG. 4. This allows output surface 72 (and, if desired, the corresponding inner and outer surfaces of an overlapping protective layer such as layer 30 of FIG. 1) to have attractive compound curvature (e.g., an attractive dome shape with a circular outline for a watch crystal).

Figure 13:
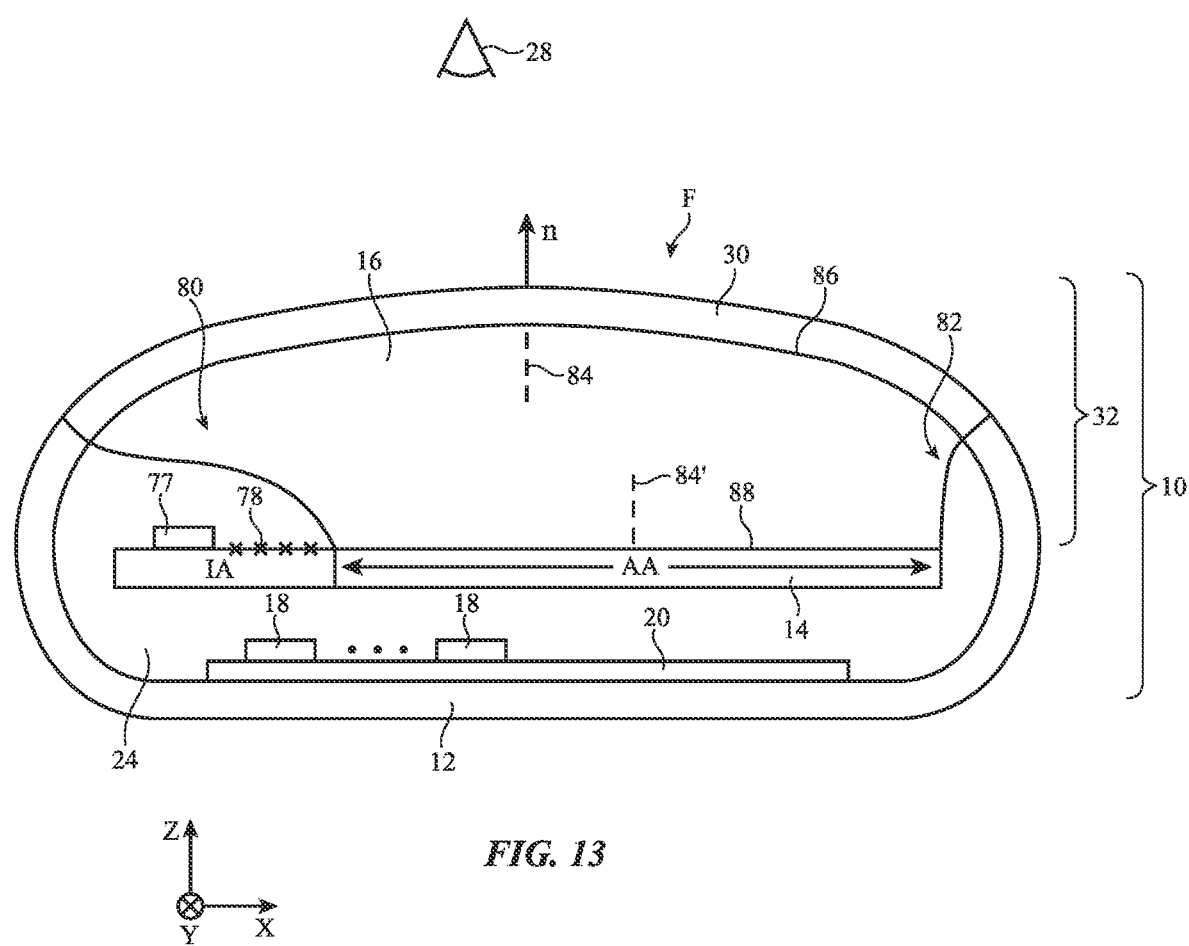
FIG. 13 is a cross-sectional side view of an illustrative device with an asymmetric image transport layer in accordance with an embodiment.

FIG. 13 is a cross-sectional side view of device 10 in an illustrative configuration in which the three-dimensional shape of image transport layer 16 is asymmetric to accommodate inactive portions of display 14. As shown in FIG. 13, display 14 may have an active area AA with an array of pixels to display an image and may have an inactive area IA. Inactive area IA may share a flexible substrate or other display substrate with active area AA. Display driver circuitry for display 14 may be formed using one or more integrated circuits such as integrated circuit 77 and/or thin-film display driver circuitry. This display driver circuitry may be formed in inactive area IA (e.g., on the same substrate used to form thin-film organic light-emitting diode pixels in active area AA). Signal paths 78 (e.g., metal traces)

may be used in routing signals between the display driver circuitry in inactive area IA and pixels in the pixel array of active area AA.

Active area AA may have a rectangular (e.g., square) outline in the X-Y plane and may have uncurved corners. Inactive area IA may protrude from one or more edges of active area AA. In the example of FIG. 13, inactive area IA protrudes in the —X direction from active area AA. To accommodate the protruding inactive area IA of display 14, image transport layer 16 of FIG. 13 has been provided with an asymmetric shape. Portion 80 of image transport layer 16 is characterized by more bending (e.g., more bending of fibers 16F and/or Anderson localization material deformation) than portion 82 of image transport layer 16. Portion 80 may therefore protrude laterally outward over inactive area IA (in the −X direction) to cover inactive area IA. This helps hide inactive area IA from view by viewer 28. Axis 84 is located in the center of protective layer 30 and the center of output surface 86. Output surface 86 of image transport layer 16 may have a circular shape that is rotationally symmetric about axis 84 (as an example). The rectangular pixel array of active area AA may have a center (center 84') that is laterally offset with respect to axis 84 in the X-Y plane. Mating rectangular input surface 88 of image transport layer 88 may also be offset laterally in the X-Y plane with respect to axis 84.

Figure 14:
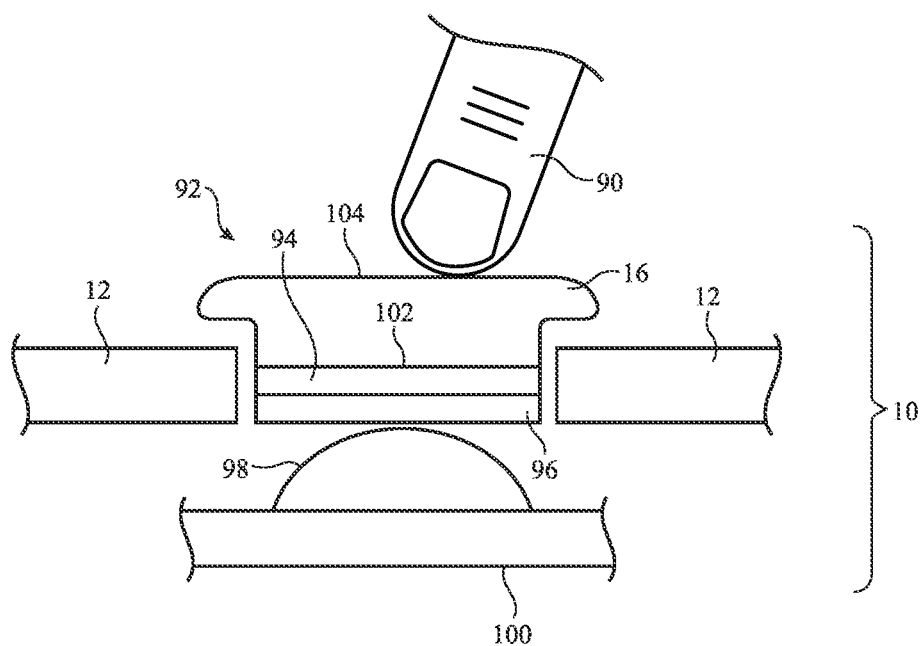
FIG. 14 is a cross-sectional side view of an illustrative button with image transport layer material in accordance with an embodiment.

FIG. 14 shows how electronic device 10 may include a button formed from image transport layer material. In the example of FIG. 14, button 92 has been mounted in an opening in housing 12 of device 10. Image transport layer 16 may have a curved output surface (exterior surface) or other suitable surface shape that receives button press input from a user's finger (finger 90). A protective cover layer may be included over the output surface of layer 16, if desired. When pressed in the downward direction of FIG. 14, a button member formed from image transport layer 16 and components 102 and 96 moves downwards to compress an associated button switch such as switch 98. Switch 98 may be a dome switch or other suitable switch for detecting button press events. Switch 98 or other biasing structures may provide an upwards restoring force that helps the button member return to its original undepressed position when released.

Switch 98 may be mounted on a printed circuit such as printed circuit 100 that has signal lines that couple switch 98 to the control circuitry of device 10. Components 102 and 96 may be used in presenting a desired image to the input surface associated with image transport layer 16 (e.g., the lower surface of layer 16 of FIG. 14). In an illustrative arrangement, component 96 is an electrically adjustable light source such as one or more light-emitting diodes or lasers and component 94 is a diffuser layer. Component 94 may be provided with an optional masking pattern (e.g., a black ink layer or other mask with a clear opening or diffuse white opening in the shape of an alphanumeric label, an icon, or other button label) to pattern the light presented to the input surface of image transport layer 16. The lower surface (input surface) of layer 16 may have a square shape with uncurved corners, a circular shape, or other shape that is matched to the outline of components 94 and 96 (e.g., components with rectangular shapes, circular outlines, etc.) and the upper surface (output surface) of layer 16 may have a shape with a desired appealing appearance for the user (e.g., a rectangular shape with curved corners and a surface with regions of compound curvature, a circular shape with an output surface of compound curvature, etc.). Illustrative input and output surface shapes for image transport layer 16 of button 92 are shown in FIGS. 6, 7, 8, 9, and 10 (as examples).

Figure 15:
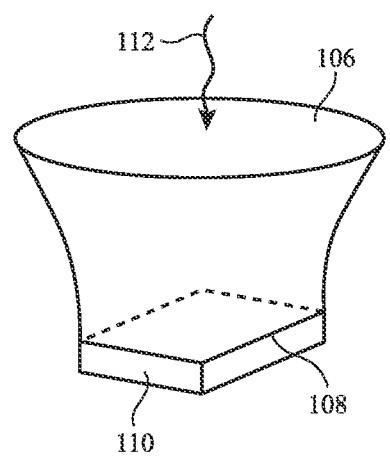
FIG. 15 is a perspective view of an image transport layer structure having a circular input surface for gathering light and a rectangular output surface at which the gathered light is supplied to a sensor in accordance with an embodiment.

In the illustrative arrangements of FIG. 15, optical sensor 110 (e.g., a semiconductor photodetector) has a die (e.g., a semiconductor die) with a rectangular shape (e.g., a square shape or other shape). Image transport layer 16 of FIG. 15 may be mounted in a window region of housing 12 (e.g., to capture incoming ambient light 112 or other incoming light from exterior 22 of device 10 during operation of device 10). Sensor 110 may, as an example, be an optical sensor such as a proximity sensor, optical touch sensor, ambient light sensor, etc. To ensure that the outward appearance of the window region for sensor 110 is satisfactory, image transport layer 16 may have an outwardly facing input surface 106 with a circular shape or other attractive shape. The light 112 that is received at circular input surface 106 may be transported to a rectangular (e.g., square) output surface such as output surface 108. Output surface 108 may have the same shape (or nearly the same shape) as sensor 110 and/or the active photodetector area of sensor 110.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
   an image transport layer configured to receive light at an input surface having a first shape and to transport the light from the input surface to an output surface having a second shape; and
   an optical sensor configured to receive the light from the output surface of the image transport layer.

2. The electronic device defined in claim 1, wherein the optical sensor comprises a semiconductor die.

3. The electronic device defined in claim 2, wherein the semiconductor die has a rectangular shape and the second shape of the output surface of the image transport layer is the rectangular shape.

4. The electronic device defined in claim 3, wherein the first shape of the input surface of the image transport layer is a circular shape.

5. The electronic device defined in claim 1 further comprising:
   a housing having a window region, wherein the image transport layer is mounted in the window region.

6. The electronic device defined in claim 5, wherein the input surface of the image transport layer faces an exterior of the electronic device.

7. The electronic device defined in claim 6, wherein the light received at the input surface of the image transport layer comprises ambient light.

8. The electronic device defined in claim 1, wherein the optical sensor comprises a proximity sensor.

9. The electronic device defined in claim 1, wherein the optical sensor comprises an optical touch sensor.

10. The electronic device defined in claim 1, wherein the optical sensor comprises an ambient light sensor.

11. The electronic device defined in claim 1, wherein the optical sensor has a shape that is the same as the second shape of the output surface of the image transport layer.

12. The electronic device defined in claim 1, wherein the optical sensor has an active photodetector area, and the active photodetector area has a shape that is the same as the second shape of the output surface of the image transport layer.

13. The electronic device defined in claim 1, wherein the image transport layer comprises a coherent fiber bundle.

14. The electronic device defined in claim 1, wherein the image transport layer comprises Anderson localization material.

15. An electronic device comprising:
a housing having an opening; and
a button mounted in the opening of the housing, the button including:
an image transport layer having an input surface and an output surface, the input surface of the image transport layer facing an interior of the electronic device and having a first shape, and the output surface of the image transport layer facing an exterior of the electronic device and having a second shape; and
a light source configured to provide light to the input surface of the image transport layer.

16. The electronic device defined in claim 15, wherein the image transport layer and the light source form a button member of the button, and the button comprises a switch configured to be compressed by the button member to detect a press input.

17. The electronic device defined in claim 15, wherein the button comprises a diffuser layer between the light source and the image transport layer.

18. The electronic device defined in claim 17, wherein at least one of the diffuser layer or the light source has a shape that matches the first shape of the input surface of the image transport layer.

19. The electronic device defined in claim 17, wherein the light source is an electrically adjustable light source, and the diffuser layer has a masking pattern configured to pattern the light provided to the input surface of the image transport layer.

20. An electronic device comprising:
a semiconductor die with a rectangular shape at least partly forming a photodetector; and
an image transport layer configured to receive light at an input surface having a non-rectangular shape and to transport the light from the input surface to an output surface having a shape that matches the rectangular shape of the semiconductor die, wherein the photodetector is configured to receive the light from the output surface of the image transport layer.

\* \* \* \* \*